(12) United States Patent
Raju et al.

(10) Patent No.: US 12,099,817 B2
(45) Date of Patent: Sep. 24, 2024

(54) INTELLIGENT INDUSTRY COMPLIANCE REVIEWER

(71) Applicant: Accenture Global Solutions Limited, Dublin (IE)

(72) Inventors: Roji Samuel Raju, Pune (IN); Pallavi Kelapure, Pune (IN); Onkar Nilesh Mane, Pune (IN); Mainak Chakraborty, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 367 days.

(21) Appl. No.: 17/586,753

(22) Filed: Jan. 27, 2022

(65) Prior Publication Data

US 2023/0236802 A1 Jul. 27, 2023

(51) Int. Cl.
*G06F 40/284* (2020.01)
*G06F 8/10* (2018.01)
*G06F 18/21* (2023.01)
*G06F 18/214* (2023.01)
*G06N 3/08* (2023.01)
*G06N 20/10* (2019.01)

(52) U.S. Cl.
CPC .............. *G06F 8/10* (2013.01); *G06F 18/214* (2023.01); *G06F 18/217* (2023.01); *G06F 40/284* (2020.01); *G06N 20/10* (2019.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | | |
|---|---|---|---|---|
| 8,365,138 B2 * | 1/2013 | Iborra | ................ | G06F 16/2365 717/113 |
| 10,853,536 B1 * | 12/2020 | Steingrimsson | ........ | G06F 30/20 |
| 11,263,395 B1 * | 3/2022 | Wu | ........ | G06F 40/186 |
| 2004/0006403 A1 * | 1/2004 | Bognanno | ............ | G06Q 10/103 700/109 |
| 2005/0060317 A1 * | 3/2005 | Lott | ........ | G06Q 10/00 715/239 |
| 2006/0037016 A1 * | 2/2006 | Saha | ........ | G06F 8/61 717/178 |
| 2012/0303776 A1 * | 11/2012 | Ferris | ........ | G06F 9/45558 709/223 |

(Continued)

*Primary Examiner* — Lamont M Spooner

(57) ABSTRACT

Aspects of the present disclosure provide systems, methods, and computer-readable storage media that support automatic compliance validation using a dynamically generated set of validation code. The compliance validation process may begin by extracting requirements from a compliance specification. Once extracted, the requirements may be tokenized and vectorized to produce vectorized data. The vectorized data may be labeled using a multi-label classifier to produce a set of labeled data (e.g., labeled vectors representing the requirements extracted from the compliance specification). The set of labeled data may be fed to a machine learning model configured to map the labeled data to pieces of code stored in one or more code libraries. A set of validation code is generated based on the pieces of code mapped to the labeled data and the set of validation code may be applied to a deliverable to evaluate compliance of the deliverable with the requirements.

20 Claims, 3 Drawing Sheets

(56) References Cited

U.S. PATENT DOCUMENTS

| | | | |
|---|---|---|---|
| 2014/0019943 A1* | 1/2014 | Easwaran | G06F 8/74 |
| | | | 717/126 |
| 2014/0068697 A1* | 3/2014 | Brucker | G06F 21/563 |
| | | | 726/1 |
| 2014/0172417 A1* | 6/2014 | Monk, II | G06F 40/30 |
| | | | 704/9 |
| 2014/0201111 A1* | 7/2014 | Kasravi | G06N 3/084 |
| | | | 706/12 |
| 2015/0324573 A1* | 11/2015 | Li | G06F 21/316 |
| | | | 726/18 |
| 2016/0070579 A1* | 3/2016 | Furtwangler | G06F 8/315 |
| | | | 717/116 |
| 2017/0093793 A1* | 3/2017 | Waldron | H04L 61/3005 |
| 2019/0050210 A1* | 2/2019 | Van Der Jeugt | G06F 8/35 |
| 2020/0097388 A1* | 3/2020 | Bhat | G06F 11/3608 |
| 2020/0117573 A1* | 4/2020 | McGloin | G06F 8/77 |
| 2021/0067537 A1* | 3/2021 | Khanna | G06F 21/31 |
| 2021/0311843 A1* | 10/2021 | Tanabe | G06F 8/22 |
| 2021/0312361 A1* | 10/2021 | Daley | G06N 20/00 |
| 2021/0397447 A1* | 12/2021 | Crabtree | G06Q 20/065 |
| 2022/0113962 A1* | 4/2022 | Delville | H04L 67/34 |
| 2023/0208882 A1* | 6/2023 | Crabtree | G06F 21/577 |
| | | | 726/22 |
| 2023/0305813 A1* | 9/2023 | Jalal | G06F 9/455 |

* cited by examiner

INTELLIGENT INDUSTRY COMPLIANCE REVIEWER

TECHNICAL FIELD

The present disclosure relates generally to techniques for compliance validation and more particularly, automated techniques for dynamically building a set of validation code that is executable against information associated with a product or service to validate that the product or service complies with requirements of one or more compliance specifications.

BACKGROUND

One of the most essential ethics for any business today is compliance with industry standards required by a regulatory authority. The regulatory authority may be a government authority, such as the Food and Drug Administration (FDA), or a non-government authority (e.g., an industry consortium, etc.). The industry standards may be specified in a document, referred to herein as a compliance specification, and may contain various requirements that should be met to ensure that a product or process in compliance with the standard(s) meets a desired level of quality, functionality, or some other goal (e.g., privacy, security, etc.).

Currently, validating compliance with industry standards presents a significant challenge and entities expend a great deal of effort in reviewing different deliverables from a compliance perspective (e.g., to ensure compliance with one or more compliance specifications). In particular, due to the predominately manual validation processes used today, many organizations have separate departments dedicated to perform compliance tasks. Due to the tedious nature of compliance review processes, the manual processes used today are prone to error and require a significant amount of time to complete. Furthermore, achieving accurate compliance assessments is critical because non-compliance may result in penalties (e.g., imprisonment, fines, etc.) being imposed on an entity or otherwise negatively impacting the entity (e.g., loss of revenue, loss of reputation, loss of staff, loss of productivity due to down time caused by non-compliance, and the like).

SUMMARY

Aspects of the present disclosure provide systems, methods, apparatus, and computer-readable storage media that support automated compliance validation using a dynamically generated set of validation code. To facilitate compliance validation, a compliance device configured according to the concepts disclosed herein obtains a compliance specification (e.g., a document containing text or other information related to the applicable industry standard), and parses the compliance specification to extract requirements information. The requirements information may correspond to the various pieces of the compliance specification with which a deliverable should comply. For example, the deliverable may be associated with a system or system functionality (e.g., an automated manufacturing process) and the compliance specification may include requirements or guidance that specifies features (e.g., design features, safety features, security features, and the like) that the system or system functionality should include.

The requirements, once extracted, may be provided as inputs to a modelling engine of the compliance device. The modelling engine may be configured to leverage various machine learning models and natural language processing techniques to map the requirements to a set of validation code that may be used to perform compliance validation for the deliverable. For example, the modelling engine may convert the requirements into vectorized data using tokenization and vectorization processes. In some aspects, multiple tokenization and vectorization processes may be utilized to produce different sets of vectorized data based on the requirements (e.g., a set of vectorized data that is agnostic to context within the requirements and a set of vectorized data that accounts for context within the requirements). The vectorized data may be labeled using a multi-label classifier to produce labeled data, where the labels applied to the vectorized data may provide insights into the characteristics and types of requirements (e.g., condition requirements, functionality requirements, code requirements, etc.). The labeled data may be fed to a deep neural network (DNN) that maps the labeled data to pieces of code (e.g., scripts, code snippets, etc.) stored in one or more code libraries and the pieces of code identified by the mapping provided by the DNN may be used to construct a set of validation code.

Once generated, the set of validation code may be applied to information associated with the deliverable (e.g., source code corresponding to the deliverable, design documents or specifications, etc.) to evaluate whether the deliverable is compliant with each of the requirements. As the validation is performed, results of the validation may be stored to a log. The log may include information that identifies the various requirements that were tested during the validation, whether the deliverable passed or failed each of the requirements, or other types of information. The log may be used to generate an output that may be provided to a user, where the output may be a document generated based on the log or merely information displayed to a user in a graphical user interface. As changes to the deliverable and/or the compliance specification are made, the functionality of the modelling engine may be invoked to re-run the compliance validation using the updated compliance specification and/or the updated deliverable.

Using the dynamic code building techniques provided by modelling engines in accordance with the concepts disclosed herein, compliance validations may be performed more rapidly and with more accuracy as compared to the presently used manual techniques. Moreover, logging the results of the compliance validations may enable information to be provided to a user in a manner that enables the user to quickly determine the state of compliance and identify any requirements that did not pass the validation testing. In some aspects, information associated with portions of the deliverable that were checked using the set of validation code may be incorporated into the log, which may enable the user to identify specific portions of the deliverable that are not compliant and enable the user to more quickly remedy those portions of the deliverable and bring them into compliance.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support dynamic generation of sets of validation code. To facilitate compliance validation according the concepts disclosed herein, requirements are extracted from a compliance specification and subjected to tokenization and vectorization processes, which convert the requirements into a format suitable for use with machine learning models. The vectorized requirements data is then processed by a multi-label classifier to categorize and classify the requirements. Outputs of the multi-label classifier are fed to a DNN model that maps the labeled requirements data to pieces of code stored in one or more code libraries. The mapped pieces of code may be used to form a set of validation code suitable for performing compliance validation of a deliverable. Once generated, the set of validation code may be applied to the deliverable to perform compliance validation. The dynamic code generation and machine learning techniques utilized by embodiments of the present disclosure provide a new technique for automatically evaluating deliverables for compliance with requirements of one or more compliance specifications. Additionally, the disclosed techniques may enable users to view a log that provides information regarding the deliverable's compliance state, identify any requirements for which the deliverable is not compliant, and portions of the deliverable that are relevant to any non-compliant requirements, which may enable any detected non-compliance to be remedied quickly.

Figure 1:
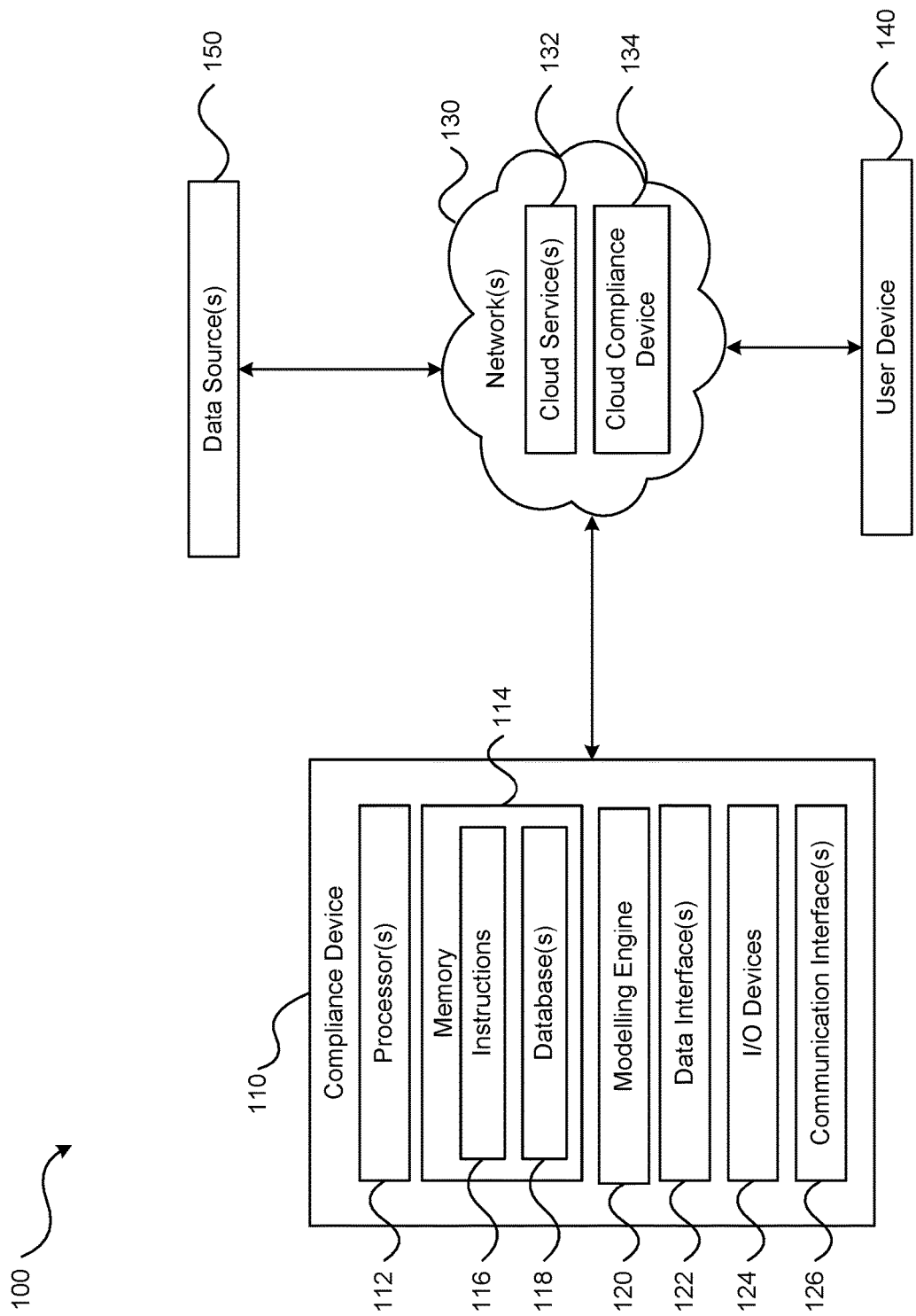
FIG. 1 is a block diagram of an example of a system that supports compliance validation using a dynamically generated set of validation code according to one or more aspects of the present disclosure.

Referring to FIG. 1, an example of a system that supports compliance validation using a dynamically generated set of validation code according to one or more aspects of the present disclosure is shown as a system 100. The system 100 may be configured to receive, as input, a compliance specification and a deliverable, and to leverage automated processes supported by artificial intelligence and machine learning techniques to evaluate whether the deliverable is compliant, in whole or in part, with one or more requirements contained within the compliance specification. The deliverable may include software (e.g., source code for an application, a script, a code snippet, and the like) or other types of targets (e.g., letters to clients or customers, public notices, etc.) that may be subject to the requirements outlined by the compliance specification and for which validation of compliance with the requirements of the compliance specification may be desired. The automated processes and supporting artificial intelligence processes may be configured to automatically extract requirements information from the compliance specification and utilize the extracted requirements to construct a model of the requirements. The model of the requirements may subsequently be used to automatically analyze the deliverable and determine whether the deliverable satisfies all, some, or none of the requirements of the compliance specification. The above-described functionality of the system 100 is described in more detail below.

As shown in FIG. 1, the system 100 includes a compliance device 110. The compliance device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The compliance device 110 includes one or more processors 112, a memory 114, a modelling engine 120, one or more data interfaces 122, one or more input/output (I/O) devices 124, and one or more communication interfaces 126. In some other implementations, one or more of the components 112-126 may be optional, one or more additional components may be included in the compliance device 110, or both. It is noted that functionalities described with reference to the compliance device 110 are provided for purposes of illustration, rather than by way of limitation and that the exemplary functionalities described herein may be provided via other types of computing resource deployments. For example, in some implementations, computing resources and functionality described in connection with the compliance device 110 may be provided in a distributed system using multiple servers or other computing devices, or in a cloud-based system using computing resources and functionality provided by a cloud-based environment that is accessible over one or more networks 130. To illustrate, one or more operations described herein with reference to the compliance device 110 may be performed by one or more servers or a cloud-based system (e.g., cloud compliance device 134) that communicates with one or more external devices.

The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the compliance device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the compliance device 110 may be stored in the memory 114 as instructions 116 that, when executed by the one or more processors 112, cause the one or more processors 112 to perform the operations of the compliance device 110, as described in more detail below. Additionally, the memory 114 may be configured to store data and information in one or more databases 118. Illustrative aspects of the one or more databases 118 are described in more detail below. Furthermore, it is noted that FIG. 1 shows the one or more databases 118 being stored at the memory 114 of the compliance device 110 for purposes of illustration, rather than by way of limitation and in some implementations all or some of the one or more databases 118 may be stored external to the compliance device 110, such as at one or more data sources 150 accessible via the one or more networks 130 or stored in a cloud-based data storage, shown in FIG. 1 as cloud service(s) 132.

In some implementations, the compliance device 110 includes one or more input/output (I/O) devices 124 that include one or more display devices, a keyboard, a stylus, one or more touchscreens, a mouse, a trackpad, a microphone, a camera, one or more speakers, haptic feedback devices, or other types of devices that enable a user to receive information from or provide information to the compliance device 110. In some implementations, the compliance device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the compliance device 110. The one or more communication interfaces 126 may be configured to communicatively couple the compliance device 110 to the one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like).

The modelling engine 120 may be configured to provide various types of functionality to analyze deliverables for compliance with one or more compliance specifications. As briefly explained above, the compliance specifications may include regulatory requirements issued by a government or government agency, requirements of a non-governmental entity (e.g., requirements specified in a business, such as requirements for internal governance, requirements specified in customer agreements, and the like), or other types of information that provide requirements that a deliverable should satisfy. The compliance specifications may be received as one or more documents or files containing text (e.g., portable document format (.pdf) files, Microsoft Word (.doc, .docx, etc.) files, or other format). For example, the compliance specification may be a document associated with Good Automated Manufacturing Practice (GAMP) guidelines, which set forth principles and procedures designed to help ensure that automated processes are designed and implemented in a manner that ensures certain quality standards are met. For example, GAMP guidance has been created for a variety of different automated systems and processes, including, but not limited to, calibration management, electronic data archiving, global information systems control and compliance, information technology (IT) infrastructure control and compliance, validation of laboratory computerized systems, and validation of process control systems. It is noted that compliance specifications based on GAMP guidance have been provided for purposes of illustration, rather than by way of limitation and that the compliance device 110 may be readily utilized with other types of compliance specifications, such as specifications based on General Data Protection Regulation (GDPR) or processes and controls that are merely developed internally by an entity to control aspects of its operations. Accordingly, it is to be understood that the compliance specifications described herein are provided by way of non-limiting examples and that the functionality described with reference to the compliance device 110 may be utilized with any sort of compliance specification.

As will be described in more detail below with reference to FIGS. 2 and 3, the modelling engine 120 may provide functionality configured to automatically extract requirements from the compliance specification, generate labeled requirements data using a multi-label classifier, and use a machine learning model to dynamically build a set of validation code using one or more code libraries based on the labeled requirements data. The set of validation code may be built from pieces of code stored in one or more code libraries (e.g., a code database of the one or more databases 118, a code library maintained by one of the one or more data sources 150, etc.). Once generated, the set of validation code may be evaluated against the deliverable to evaluate whether the deliverable satisfies the requirements of the compliance specification. One or more outputs may be generated based on the evaluation of the deliverable against the set of validation code. The outputs may include information indicating a result of the evaluation of each requirement against the deliverable. For example, the outputs may indicate that the deliverable passed zero or more requirements, the deliverable failed zero or more requirements, or other information. The outputs may be presented to a user. For example, user device 140 may be a desktop computing device, a laptop computing device, a smartphone, a tablet computing device, or other form of device suitable for displaying the outputs to the user. In addition to displaying the outputs to users, the compliance device 110 may be configured to provide the outputs to users via various other mediums (e.g., e-mail, print, file transfer tools, uploading the outputs to a website, etc.). In some aspects, when the log outputs indicate that the deliverable is non-compliant with one or more requirements, an alert (e.g., a text message, e-mail, or other form of notification) may be generated and provided to the user. It is noted that the exemplary operations described above are intended to provide a high level view of the operations and functionality provided by the compliance device, and more particularly, the modelling engine 120. Further details and examples of the functionality and operations of the modelling engine 120 described above are described in detail below with reference to FIGS. 2 and 3.

The one or more data interface(s) 122 of the compliance device 110 may be configured to facilitate various data operations in support of the modelling engine 120. For example, the data interface(s) 122 may provide an interface to one or more data sources 150 that enables the modelling engine 120 to retrieve data from and/or provide data to the one or more data sources 150. For example, the one or more data sources 150 may include a code database and the modelling engine 120 may access the code database via the one or more data interfaces 122 to obtain at least a portion of the code during formation of the set of validation code. As another example, the one or more data interfaces 122 may include interfaces for pulling data (e.g., from the one or more data sources 150), feeding data to the compliance device 110 or external systems and services (e.g., cloud-services 132, etc.), sorting data, searching data, or other types of data operations for providing information to or retrieving data from the compliance device 110 or another device or system (e.g., the cloud services 132, the user device 140, the one or more data sources 150, etc.). For example, as changes are made to the compliance specifications the data interface(s) 122 may pull data from a repository of compliance specifications, such as a database of GAMP specifications maintained by the International Society for Pharmaceutical Engineering (IPSE). Once the new version of the compliance specification is pulled via the one or more data interfaces 122, the modelling engine 120 may perform various operations to extract requirements from the compliance specification and evaluate whether a deliverable (e.g., a system, software, etc. intended to be compliant with the compliance specification) satisfies the requirements, as described briefly above and in more detail below. It is noted that the exemplary data interface functionality described above has been provided for purposes of illustration, rather than by way of limitation and it should be understood that the data interface(s) 122 may provide other types of functionality to support the operations of the modelling engine 120 and the system 100.

The functionality provided by the modelling engine 120 may additionally be configured to leverage third party tools and services to facilitate at least some of the operations used to validate compliance of deliverables. For example, the third party tools and services may include cloud-based services 132, which may include services that provide various types of functionality for processing data in a manner that supports the operations of the modelling engine 120. For example, the cloud-based services 132 may include services such as Google Vision API, Google Natural language API, and the like. To illustrate, the modelling engine 120 may utilize the Google Vision API to read or scan retrieved compliance specifications. In an aspect, the reading or scanning of the compliance specification may include transforming the compliance specification from a first file type to a second file type. To illustrate, the compliance specification, as retrieved by the compliance device 110 may be in a first document format (e.g., a .pdf, a .doc, or a .docx format) and the reading or scanning of the compliance specification may generate a new instance (or copy) of the compliance specification in a second document format, such as a JavaScript Object Notation (JSON) format. Converting the compliance specification from the first format to the second format may improve certain processes for analyzing and extracting information from the compliance specification. To illustrate, the JSON format may impart a structure to the text of the compliance specification that helps the modelling engine 120 identify important sections of the compliance specification (e.g., fields, objects, properties, and the like), which may streamline processes for extraction of requirements from the compliance specification.

As another example, the modelling engine 120 may utilize Google Natural Language API to pre-process information of the compliance specification, such as performing initial steps for Natural Language Understanding (NLU), which may be used by the modelling engine 120 to extract requirements or other information from the compliance specification. It is noted that Google Vision API and Google Natural language API have been described for purposes of illustration, rather than by way of limitation and the cloud-based services 132 may include other types of services and tools suitable for use by the modelling engine 120 in accordance with the concepts disclosed herein. Leveraging the cloud-based services 132 allows the modelling engine 120 to take advantage of resources of cloud-based platforms (e.g., infrastructure, storage, services, computing resources, etc.) and enables the compliance device 110 to be scaled more efficiently than would be possible in implementations where all functionality and computing resources are local to the compliance device 110. However, it should be noted that in some implementations, all functionality and computing resources utilized to perform the operations of the compliance device 110 may be local to the compliance device 110, which may be advantageous in certain situations (e.g., where data security or privacy with respect to the deliverable may be a priority).

Figure 2:
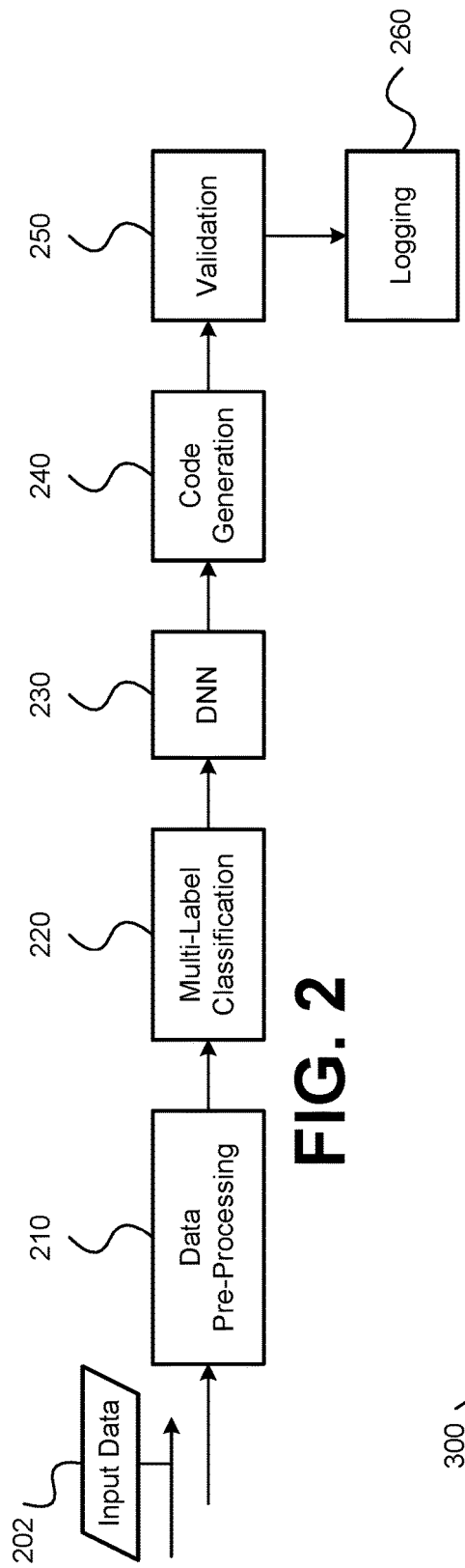
FIG. 2 shows a processing flow for compliance validation using a dynamically generated set of validation code according to one or more aspects of the present disclosure.

To further illustrate the operations of the modelling engine 120, and turning to FIG. 2, a block diagram illustrating an exemplary processing flow for validating deliverables in accordance with aspects of the present disclosure is shown. As shown in FIG. 2, an input dataset 202 may be obtained. As described above, the input dataset 202 may include a compliance specification, such as a GAMP specification. The input dataset 202 may also include a deliverable that is to be checked for compliance with requirements of the compliance specification. At block 210, the input dataset may be subjected to various data pre-processing operations. In an aspect, the data pre-processing operations performed at block 210 may be developed using a natural language tool kit (NLTK), where functionality developed using the NLTK may be built into the modelling engine 120 or may be provided by a third party tool or service, such as the cloud services 132 of FIG. 1.

The data pre-processing functionality developed using the NLTK may be configured to parse the compliance specification and extract the requirements contained therein. To illustrate, as initially obtained, the contents of the compliance specification may contain formatted text. As a non-limiting example, when the original format of the compliance specification is a .docx format, the contents may be wrapped within three object levels: a lowest level may correspond to run objects (e.g., a contiguous run of text with the same style), a middle level may correspond to paragraph objects (e.g., each paragraph of text may be identified as a different paragraph object and each paragraph object may include a list of run objects corresponding to the text of the paragraph), and a highest level may correspond to document objects (e.g., an object representing the entire compliance specification document).

Leveraging the different object levels described above, the data pre-processing functionality may convert the compliance specification from its original format to a JSON format. As a non-limiting example, when the compliance specification is originally obtained in a .docx format, the conversion to the JSON format may be performed using the python-docx module, which is a tool written in Python for reading contents of documents of the .docx file type. It is noted that different document types may have different object formats for the contents. As such, the data pre-processing functionality provided at block 210 may be configured to handle different types of object formats, such as object formats for .pdf files, .docx files, and the like. When a compliance specification is provided (e.g., as the input dataset 202), the document type may be determined and appropriate functionality for converting the format of the detected document type to a JSON format may be selected and utilized to perform various aspects of the data pre-processing. It is noted that converting the compliance specification to the JSON format may impart structure to the contents of the compliance specification, such as storing and/or associating the requirements identified within the compliance specification under a specific object type. Furthermore, some compliance documents, such as GAMP 5, may include tables from which requirements may be extracted during the conversion process. It is noted that functionality developed using the NLTK may be configured to handle other types of document types besides the .docx document type, such as .pdf documents, .doc documents, or other document types. In an aspect, the extracted requirements may be stored in runtime memory (e.g., the memory 114 of FIG. 1) where they may be subsequently accessed for further analysis and processing. In an aspect, the extracted requirements may be stored as a list type object in the runtime memory.

Following data pre-processing, the requirements may be analyzed using one or more machine learning models, at block 220. At block 220, a tokenization process may be executed to break the requirements down into sentence tokens and word tokens. In particular, the tokenization may break the text of the extracted requirements down into words and sentences (e.g., a group of words), each sentence representing a sentence token and each word representing a word token. Once the sentence tokens and word tokens are created, the sentence and word tokens may be subjected to a vectorization process. During vectorization, each of the word tokens may be converted to a numerical representation. For example, the phrase "This field is null" (e.g., a sentence formed from 4 word tokens) may be converted to a numeric form, such as the numeric form shown in Table 1 below:

TABLE 1

| 0.0 | 0.68 | 0.2 | 0.72 |
|---|---|---|---|

In Table 1, "0.0" represents the numeric form of the word "This", "0.68" represents the numeric form of the word "field", "0.2" represents the numeric form of the word "is", and "0.72" represents the numeric form of the word "null". In this manner, each word or word token may be converted to a format (e.g., a numeric format) suitable for use with one or more machine learning models and sentence tokens may be converted to vectors (e.g., Table 1 represents a vector for the sentence "This field is null" and each element of the vector corresponds to a vectorized form of the word tokens of the sentence or sentence token).

Once tokenization and vectorization is complete, the vectorized data may be fed to a model. During training of the model (e.g., via the training module 220), each vector (e.g., a vectorized form of sentence tokens, as in Table 1) may be weighed against a lexicon derived from a set of training data and corresponding labels for the sentences represented by each vector may be assigned. In an aspect, the labels may be assigned to vectors in a binary format, where "1" indicates the presence of a label and "0" indicates no label. For example, suppose a label set includes labels for the following terms: "field", "is_null" (or "is null"), "foo", "bar", and "baz". The model may be configured to apply labels to the vectors based on the label set. Using the vector described above (e.g., "This field is null"), the model may output a set of labels for the vector described above with reference to Table 1 may be as shown in Table 2:

TABLE 2

| 1 | 1 | 0 | 0 | 0 |
|---|---|---|---|---|

As shown above in Table 2, the labels applied to the vector representation of the sentence "This field is null" may indicate that the labels associated with "field" and "is_null" are present in the vector, but the labels associated with "foo", "bar", and "baz" are not present in the vector. Through training, the model may be configured to return a "best fit" hyperplane that divides or categorizes the vectors, represented by the above-described tokens and vectors, into different categories. In a non-limiting example, the above-described model may be a linear support vector classifier (LinearSVC) model, which may provide more flexibility in the choice of penalties and loss functions and may scale better to large numbers of samples, such as may be encountered when analyzing compliance specifications, deliverables, or other data in accordance with the concepts described herein. Additionally, LinearSVC may also supports both dense and sparse input.

After training is complete, features may be fed to a multi-label classifier model of the modelling module 120, which may be configured to classify the requirements according to one or more categories or classes. In an aspect, the multi-label classifier model may utilize a OneVsRest-Classifier (OvR) algorithm, which is a heuristic method for using binary classification algorithms for multi-class classification. The OvR algorithm may be configured to split a multi-class dataset into multiple binary classification problems. A binary classifier (e.g., the above-described LinearSVC model) may then be trained on each binary classification problem, as described above. Once trained, the multi-label classifier model may be configured to generate "predictions" for each vectorized requirement. The predictions may include a scoring metric (e.g., probability or score) indicating a confidence level that a given vector is correctly attributed (e.g., based on the labels) to a particular class. In an aspect, the scoring metric may be a confidence score determined based on a signed distance of the sample (e.g., a vector) under consideration to the hyperplane(s). The predicted classes, which may be selected based on the confidence levels, may be used to tag the vectors with multiple labels to define a category for each vector (or sentence). The labels may define a type of each vector (or sentence), a required operation/condition (e.g., comparison, summation, division, etc.), and/or other supporting labels. The classes assigned by the multi-label classifier may also indicate whether the requirement (sentence) is useful for further analysis.

As a non-limiting and illustrative example, suppose that the multi-label classifier is configured to classify requirements as either an operation or a condition. During training, the binary classifier may be trained to configure labels for vectors representing operations requirements (e.g., addition, subtraction, division, etc.) and may also be trained to configure labels for vectors representing conditions requirements (e.g., comparisons, input received for one or more required data fields, etc.). Once training is complete, the multi-label classifier model may be executed against a set of vectorized requirements and classify the vectorized requirements as belonging to the operation class or the condition class based on labels associated with the vectors. In performing the classification, the multi-label classifier will evaluate the vectorized requirements and generate predictions representing a confidence level with respect to whether each vectorized requirement belongs to the operation class or the condition class. A final classification may be determined based on the predictions, where the prediction representing the highest confidence level may be selected for classification of each vectorized requirement. It is noted that while the example above illustrates two classes, the multi-label classifier models utilized by the modelling engine 120 of FIG. 1 may utilize more than two classes. In such an arrangement, the OvR algorithm of the model may generate a prediction of whether a vector belongs to a particular classification as compared to all other classifications for each classification (e.g., classification 1 as compared to classifications 2, 3, and 4; classification 2 as compared to classifications 1, 3, and 4; and so on) and may assign classifications to the vector based on the models having the best fit (e.g., the predictions satisfy a threshold confidence level, such as 80%, 85%, 90%, 95%, etc.). Moreover, it is to be understood that the multi-label classifier model may be configured to assign multiple labels or classes to a single vector in some implementations (e.g., when multiple classifications satisfy the threshold confidence level).

Figure 3:
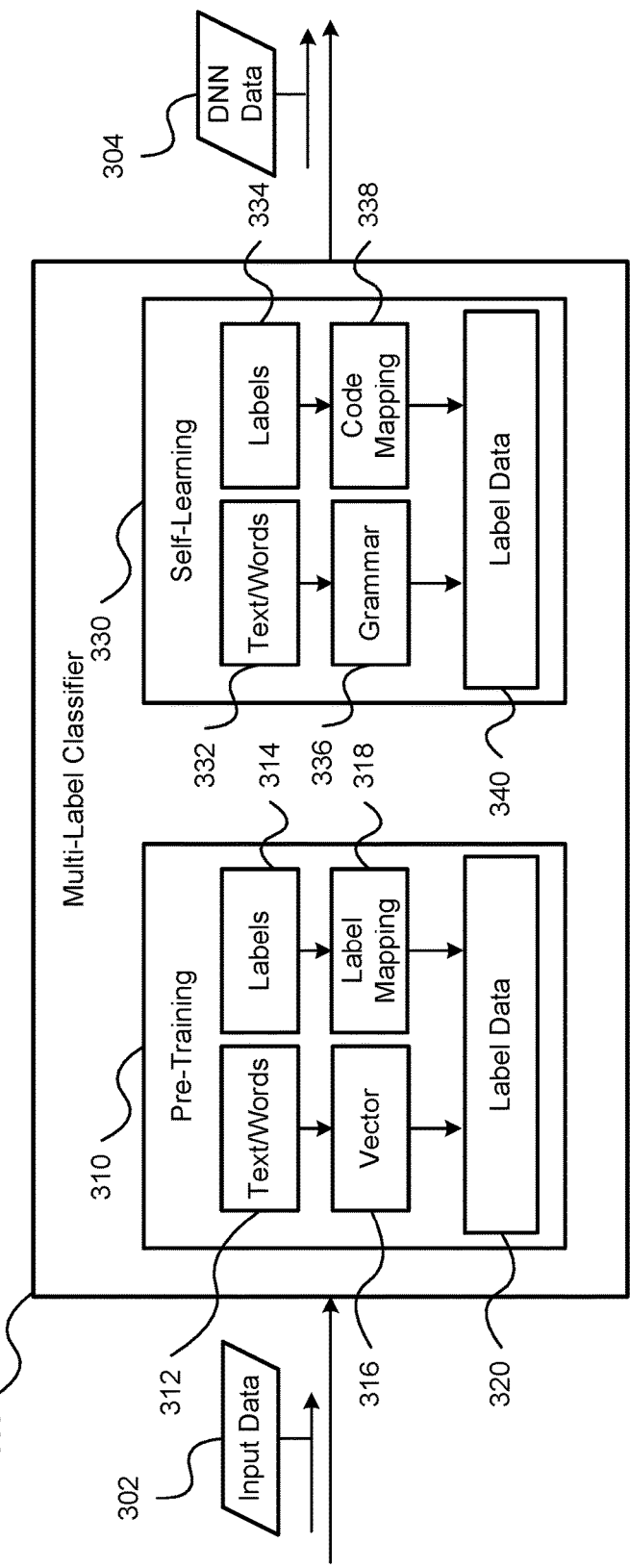
FIG. 3 is a block diagram illustrating an exemplary multi-label classifier for supporting compliance validation using a dynamically generated set of validation code according to one or more aspects of the present disclosure.

Referring briefly to FIG. 3, a block diagram illustrating exemplary aspects of a multi-label classifier model in accordance with aspects of the present disclosure is shown as a multi-label classifier 300. As shown in FIG. 3, the multi-label classifier 300 may include a pre-training portion 310 and a self-learning portion 330. Input data 302 (e.g., requirements) may be provided to the multi-label classifier 300 for analysis and labelling, as described below. The pre-training portion 310 may include tokenization logic 312, label logic 314, vectorization logic 316, and label mapping logic 318. The tokenization logic 312 may be configured to generate tokens (e.g., sentence and word tokens) from text/words extracted from the requirements (e.g., the requirements extracted during pre-processing at block 210 of FIG. 2), as described above with reference to Table 1. The vectorization logic 316 may be configured to perform vectorization of the tokens generated by the tokenization logic 312, as described above with reference Table 2. It is noted that the tokenization logic 312 and vectorization logic 316 may be configured to analyze text (e.g., the words and sentences) in a grammar free and context-agnostic manner. For example, using the above-described NLTK, a module may be created for sentimental analysis, which is a type of data mining that measures the inclination of people's opinions through NLP, computational linguistics, and text analysis, which are used to extract and analyze subjective information. Such modules and algorithms may be utilized by the tokenization logic 310 to treat text extracted from the compliance specification as Bags of Words (BOW), where the order of words and as such, context, is ignored. Using such techniques, the original text may be filtered down to only words that are thought to carry sentiment (e.g., word tokens). The label logic 314 may be configured to maintain a set of labels that may be utilized to label vectors and the label mapping logic 318 may be configured to label each vector. As described above with reference to Table 2, the labelling may involve mapping word tokens represented (e.g., in numerical form) within each vector to the set of labels maintained by the label logic 314 and the labelling may utilize a binary representation. Utilizing the above-described techniques, the pre-training portion 310 may output a set of labeled data 320.

The self-learning portion 330 may function in a manner that is similar to the pre-training portion 310, but may be configured to account for grammar when evaluating the vectors and may output a set of labels mapping the vectors to code samples. As shown in FIG. 3, the self-learning portion 330 may include tokenization logic 332, label logic 334, vectorization logic 336, and code mapping logic 338. The tokenization logic 332 and the vectorization logic 336 may be configured to generate and vectorize tokens in a manner similar to the tokenization logic 312 and the vectorization logic 316 described above. However, unlike the vectorization logic 316, which did not take context into account, the vectorization logic 336 may be configured to account for context within each sentence (e.g., vector) during tokenization and vectorization. In an aspect, accounting for context during vectorization may achieved using a chunking and chinking technique. To illustrate, a chunk rule class may be created that specifies what words or patterns to include and exclude in a chunk, where a chunk is made up of words defined using parts-of-speech tags. Additionally, words from the sentences may be extracted based on the grammatical structure of the sentences and keywords. As an example, the keywords may be learned during training based on their frequency within a document. Utilizing the above-described contextual analysis techniques may enable vectors to be created from the compliance specification in a manner that excludes extraneous information.

The label logic 334 may be configured to maintain a set of labels corresponding to code samples (e.g., source code, code snippets, scripts, etc.) that are maintained in one or more code libraries (e.g., a code library stored in the one or more databases 118 of FIG. 1 or another source). The code mapping logic 338 may be configured to assign labels to each vector output by the vectorization logic 336 to produce labeled data 340. The assigned labels may provide information regarding one or more pieces of code that may be used to validate compliance of a deliverable with requirements represented by the labeled vector. As in the example above, the code mapping logic 338 may utilize a binary representation to apply labels to each vector based on the set of labels maintained by the label logic 334. In an aspect, the set of labels maintained by the label logic 334 may be periodically updated as new pieces of code are identified.

As shown above, the multi-label classifier 300 may output multiple vector/label set pairs 304 (e.g., a first vector/label set pair that includes the vectors and labels output by the pre-training portion 310 and a second vector/label set pair that includes the vectors and labels output by the self-learning portion 330). It is noted that while the multi-label classifier 300 has been described as providing two models that may be used to label or classify requirements of a compliance specification, such description has been provided for purposes of illustration, rather than by way of limitation and that multi-label classifiers utilized in accordance with the concepts disclosed herein may include more than two models if desired. Furthermore, while multi-label classifiers have been described herein with reference to use of Linear SVC and OvR techniques, it should be understood that the concepts described herein may be implemented using other suitable techniques if desired.

Referring back to FIG. 2, the outputs of the multi-label classifier (e.g., the different label sets described above with reference to multi-label classifier 300 of FIG. 3) may be provided to a deep neural network (DNN), at block 230. The DNN may be configured to map the outputs of the multi-label classifier to pieces of code stored in one or more code libraries (e.g., libraries storing pieces of code). For example, the labels applied to the requirements vectors by the multi-label classifier may be used by the DNN to identify pieces of code in the one or more code libraries. At block 240, the pieces of code mapped to the requirements vectors by the DNN may be utilized to generate a set of validation code. As an illustrative example, the requirements may require verification of password functionality of the deliverable and the set of validation code may include the following:

```
def check_hardcoded_password(code):
    if code.contains(password_fields( )):
        value = get_password_field( )
        if code.contains(value):
            return "FAILED"
        return "PASSED"
    return "Password field does not exist."
```

It is noted that the code shown above is provided for purposes of illustration, rather than by way of limitation. Furthermore, it is noted that the set of validation code may include program code, code snippets, scripts, etc. written in one or more programming language (e.g., Python, Pearl, C++, Java, etc.).

At block 250, the set of validation code may be used to evaluate whether a deliverable (e.g., software, code, or other documentation of a system to which the compliance specification is applicable) satisfies the requirements of the compliance specification. In an aspect, prior to performing the validation, the deliverable may be processed. Processing of the deliverable may include scanning or reading the deliverable. Since the deliverable may be a program or include calls to executable files, the deliverable may be scanned or read as a string (e.g., as text or alphanumeric characters) to avoid running any underlying logic contained therein. As the scanning of the deliverable is performed, information may be extracted from the deliverable for use in evaluating the deliverable and its compliance with the compliance specification. Where the deliverable is a program, the extracted information may include members, which may be classes, variables, functions, methods, and the like which are defined within the deliverable. The extracted members may be tagged or labeled according to their type (e.g., a class may be labeled as a "class", a variable may be labeled as a "variable", and so on). Additional properties of the members may also be labeled. For example, class level variables may be labeled as belonging to a particular class. In this manner, the deliverable may be transformed into a set of structured data objects that may be used to perform validation using the set of validation code generated at block 240.

In an aspect, parameter matching may be utilized to ensure that the set of validation code follows the correct fields and variables from the deliverable. During parameter matching the DNN may fetch the parameters from the deliverable (e.g., the structured data objects described above) and may embed the parameters in the set of validation code. By using parameter matching, the DNN may ensure that the validation code set is generated with the correct mapping of fields, objects, and identified parameters of the deliverable. Stated another way, the code samples identified by the DNN may serve as templates and the parameter matching may be used to populate the code templates with parameters that align with the deliverable (e.g., naming conventions, data types, etc.).

Once the set of validation code is finalized, it may be executed against the deliverable to evaluate whether the requirements of the compliance specification are met. For example, as shown above, the set of validation code may include code for performing verification of password functionality of the deliverable. The code may be executed against the deliverable and the outputs of the code may indicate a status of the verification (e.g., the code returns "FAILED", "PASSED", or "Password field does not exist"). At block 260, results of the validation may be recorded to a log. For example, the log may track validation results for each of the requirements identified from the compliance specification. In addition to logging the results of each requirement validation, the log may additionally capture relevant portions of the deliverable in connection with each requirement. The portions of the deliverable may include fields, objects, properties, expected values from the deliverable, or other types of information. In an aspect, the log may be used to generate an output document, which may be a .pdf file or another type of file, that includes information from the log. Additionally or alternatively, the results recorded to the log may be converted to a graphical representation. For example, information from the log may be used to generate a pie chart or other graphical representation (e.g., using plotly or another tool) that indicates the number of validations performed (e.g., how many requirements were checked during the validation), the number of validations that passed (e.g., complied with the requirements of the compliance specification), the number of validations that failed (e.g., did not comply with the requirements of the compliance specification), or other types of information. It is noted that the graphical representations may be incorporated into the output document and/or the log data may be presented in combination with the graphical representation (e.g., at a display of user device 140 of FIG. 1).

Referring back to FIG. 1, the functionality provided by the compliance device 110, as described above with reference to FIGS. 2 and 3, may leverage various machine learning models and natural language processing techniques to extract requirements from a compliance specification and label the requirements in an automated fashion. The compliance device 110 may use a DNN configured to leverage the labeled requirements information to dynamically build a set of validation code that may be used to evaluate whether a deliverable satisfies the compliance specification. Through combining pieces of code to form more complex code sets, the functionality of the DNN enables the compliance device 110 to evaluate deliverables with respect to compliance with requirements of various compliance specifications in a rapid manner (e.g., because specialized code does not need to be written). For example, when a change to a compliance specification is made, the updated compliance specification may be fed into the compliance device 110 and more specifically, the modelling engine 120, and a set of validation code may be generated and used to verify compliance of deliverables very quickly.

Moreover, the labelling provided by multi-label classifiers configured in accordance with the concepts described above with reference to FIGS. 2 and 3 function to label text data (e.g., represented as vectors) to identify characteristics associated with and types of sentences found in the compliance specification. In this manner, models leveraging the labels may be less impacted by noise (e.g., unnecessary tokens/ words). This also helps keep the model's lexicon to a minimum while keeping its accuracy intact, and also enables grammatical models to be created in a manner that serve as a building block for induced self-learning behavior (e.g., as in the self-learning portion 330 of FIG. 3).

The modelling engine 120 may be configured to store the set of validation code generated for a given compliance specification in the one or more databases 118, such as in an historic validation code database. The set of validation code may be stored with information that indicates the requirements and compliance specification version to which the set of validation code pertains. Storing the set of validation code in this manner may enable the validation code to be reused to perform compliance validation on other deliverables without having to regenerate the code set. In some aspects, when a set of validation code is reused some tuning may be performed, such as the parameter matching process described above (e.g., because there may be some differences between different deliverables that may require adjustment of certain characteristics of the set of validation code). When configured to utilize historic sets of validation code, the modelling engine 120 may be configured to retrieve a the compliance specification and then determine whether a set of validation code corresponding to the retrieved version of the compliance specification is available within the historic validation code. If a set of validation code is found, it may be selected and at least some of the above-described functionality for generating the set of validation code may be omitted (e.g., requirements extraction, multi-label classification, etc.). As another example of reuse capabilities of the modelling engine 120, if a new version of the compliance specification is detected, the requirements extraction process may be performed and compared to requirements of previous versions of the compliance specification for which sets of validation code have been generated. Where new requirements are found, additional processing may be performed as described above with reference to FIGS. 2 and 3 to generate new validation code for the new requirements, and the new validation code may be combined with portions of the prior validation code set related to unchanged requirements. The newly generated set of validation code may then be used to perform compliance validation as described herein. It is noted that the concepts for reusing validation code sets described above have been provided for purposes of illustration, rather than by way of limitation and that other techniques and processes may be utilized to facilitate reuse of validation code sets generated in accordance with the concepts disclosed herein.

Figure 4:
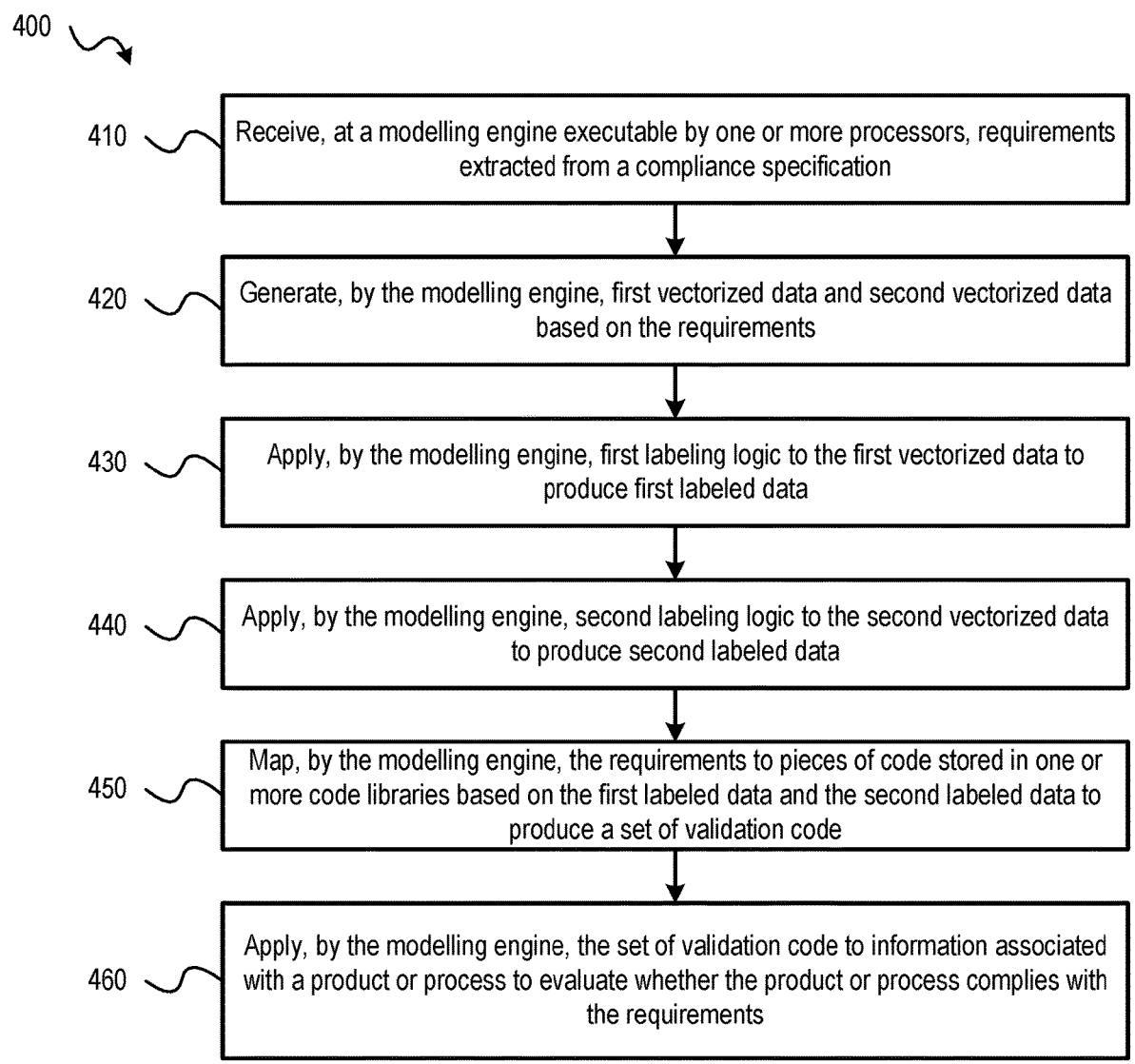
FIG. 4 is a flow diagram illustrating an example of a method for performing compliance validation using a dynamically generated set of validation code according to one or more aspects of the present disclosure.

Referring to FIG. 4, a flow diagram of an example of a method for automatic compliance validation using a dynamically generated set of validation code according to one or more aspects of the present disclosure is shown as a method 400. In some implementations, the operations of the method 400 may be stored as instructions that, when executed by one or more processors (e.g., the one or more processors 112 of FIG. 1 or processors deployed in a cloud-based platform), cause the one or more processors to perform the operations of the method 400. In some implementations, the method 400 may be performed by a computing device, such as compliance device 110 of FIG. 1, and may utilize the modelling and analysis techniques described with reference to FIGS. 2 and 3.

At step 410, the method 400 includes receiving, at a modelling engine executable by one or more processors, requirements extracted from a compliance specification. In some aspects, the compliance specification may be obtained in a first format (e.g., a .pdf format, a .docx format, etc.), converted to a second format (e.g., a JSON format), and the requirements may be extracted from the copy of the compliance specification generated in the second format. As described above, converting the compliance specification to the second format may enhance the requirements extraction process (e.g., by imparting a structure to the compliance specification that may enable the requirements to be more easily extracted).

At step 420, the method 400 includes generating, by the modelling engine, first vectorized data and second vectorized data based on the requirements. As described above with reference to FIGS. 2 and 3, the modelling engine may include a multi-label classifier having models providing functionality for performing tokenization and vectorization of the requirements. Additionally, the processes used to generate the first and second vectorized data may be different (e.g., one process may perform tokenization and vectorization without considering context (e.g., grammar, etc.) while another process may consider contextual information (e.g., grammar) when performing tokenization and vectorization.

The method 400 includes at step 430, applying, by the modelling engine, first labeling logic to the first vectorized data to produce first labeled data and at step 440, applying, by the modelling engine, second labeling logic to the second vectorized data to produce second labeled data. As described above with reference to FIGS. 2 and 3, the labelling of the first and second vectorized data may result in multiple labels being associated with the requirements. Some of the labels may be indicative of characteristics of the requirements (e.g., indicating a type of sentence associated with each requirement, a condition present in the requirement, etc.) while other ones of the labels may be suitable for mapping requirements to code samples stored in one or more code libraries. In an aspect, the labels may be represented using binary values, as described above with reference to Table 2.

At step 450, the method 400 includes mapping, by the modelling engine, the requirements to pieces of code stored in one or more code libraries based on the first labeled data and the second labeled data to produce a set of validation code. As described above with reference to FIGS. 2 and 3, the modelling engine may include a DNN that may be configured to receive outputs of the multi-label classifier (e.g., vectorized data/label pairs) and may use the outputs to select pieces of code from one or more code libraries to construct the set of validation code. In this manner, the DNN may leverage the vectorized data and labels to facilitate a template based approach for generating the set of validation code in which pieces of code are collected for use in evaluating whether a product or process, which may be represented by a deliverable object, complies with the requirements. In some aspects, a parameter mapping process may be used to condition the selected pieces of code prior to using the set of validation code to evaluate the product or process, as described above.

At step 460, the method 400 includes applying, by the modelling engine, the set of validation code to information associated with a product or process to evaluate whether the product or process complies with the requirements. When applied to the information associated with the product or process, the different pieces of code included in the set of validation code may be used to evaluate compliance of the product or process with each of the different requirements. For example, some of the pieces of code may be used to evaluate compliance with a first requirement and other pieces of code may be used to evaluate compliance with other requirements. In some aspects, the method 400 may also include additional operations, such as generating a log that includes information associated with the evaluation of whether the product or process complies with the requirements and generating an output based on the log.

As shown above, the system 100 and the method 400 provide functionality that facilitates intelligent industry compliance review (iICR). In particular, the system 100 and method 400 enable rapid generation of sets of validation code in an automated and template driven manner that enables deliverables (e.g., documents or other types of files, such as source code, including information descriptive of a process, a product, and the like) to be evaluated for compliance with one or more requirements of a compliance specification. For example, the system 100 and method 400 may be utilized to evaluate a pharmaceutical manufacturing process for compliance with requirements of a GAMP 5 compliance specification. By using the system 100 and method 400, validation that the pharmaceutical manufacturing process is in compliance with the GAMP 5 requirements may be performed more rapidly as compared to using existing techniques and may be less subject to errors (e.g., due to the ability to train the machine learning techniques). Moreover, when changes to the GAMP 5 compliance specification and/or the pharmaceutical process occur, the validation process may be initialized with the new version of the GAMP 5 compliance specification (or updated deliverable information) and a new set of validation code accounting for any changes in the compliance specification may be generated and used to evaluate the deliverable. Additionally, by providing functionality for generating logs during the compliance validation, the system 100 and the method 400 may enable compliance review results to be obtained quickly. The information maintained in the log may be used to generate outputs (e.g., graphical representations, text representations, etc.) that may convey results of the compliance review to a user in a meaningful way. For example, the outputs generated based on the logs may present information that identifies each of the requirements, the compliance status of the deliverable with respect to each requirement, and in some implementations, portions of the deliverable that were evaluated for each requirement (e.g., portions of the deliverable evaluated by the set of validation code for each requirement). This may enable any requirements that were not satisfied to be quickly identified, and facilitate identification of which portions of the deliverable, if any, were non-compliant, thereby enabling non-compliant aspects of the deliverable to be analyzed and modified to achieve compliance more quickly.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 may be performed in any order. It is also noted that the method 400 of FIG. 4 may also include other functionality or operations consistent with the description of the system 100 of FIG. 1 and the functionality and operations described with reference to FIGS. 2 and 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for automatic compliance validation using a dynamically generated set of validation code, the method comprising:
receiving, at a modelling engine executable by one or more processors, requirements extracted from a compliance specification;
generating, by the modelling engine, first vectorized data and second vectorized data based on the requirements;
applying, by the modelling engine, first labeling logic to the first vectorized data to produce first labeled data;
applying, by the modelling engine, second labeling logic to the second vectorized data to produce second labeled data;
mapping, by the modelling engine, the requirements to pieces of code stored in one or more code libraries based on the first labeled data and the second labeled data to produce a set of validation code; and
applying, by the modelling engine, the set of validation code to information associated with a product or process to evaluate whether the product or process complies with the requirements.

2. The method of claim 1, wherein a first tokenization and vectorization process is configured to ignore a grammatical structure of the requirements and the second tokenization and vectorization process is configured to consider the grammatical structure of the requirements.

3. The method of claim 1, wherein a first tokenization and vectorization process is configured to apply a first set of labels to the requirements and the second tokenization process is configured to apply a second set of labels to the requirements, wherein the first set of labels and the second set of labels are different.

4. The method of claim 3, wherein the first set of labels indicate characteristics of the requirements and the second set of labels are configured to associate the requirements to one or more pieces of code.

5. The method of claim 1, wherein the compliance specification is received in a first file format, wherein the method comprises:
reading the compliance specification in the first file format; and
generating a copy of the compliance specification based on the reading, wherein the copy of the compliance specification is associated with a second file format, and wherein the requirements are extracted from the copy of the compliance specification.

6. The method of claim 1, further comprising training a linear support vector classifier (LinearSVC) model based on requirements of a training dataset, wherein a multi-label classifier is configured based at least in part on the training of the LinearSVC model.

7. The method of claim 1, wherein the first vectorized data comprises a first set of numeric values representing words present in sentences representing the requirements, wherein the second vectorized data comprises a second set of numeric values representing words present in the sentences representing the requirements, and wherein the first labeled data and the second labeled data comprise labels derived by the first labelling logic and the second labelling logic based on the first and second sets of numeric values, respectively.

8. The method of claim 7, wherein the labels are represented in the first and second labeled data using binary values.

9. The method of claim 1, further comprising:
generating a log during the evaluating, wherein the log comprises information that indicates whether the product or process complies with the requirements; and
generating one or more outputs based on the log, the one or more outputs comprising a graphical representation of the information included in the log, a document containing the information included in the log, or both.

10. The method of claim 9, further comprising incorporating portions of the information associated with the product or process into the log based on the evaluating.

11. A system for automatic compliance validation using a dynamically generated set of validation code, the device/system comprising:
a memory;
one or more processors communicatively coupled to the memory, the one or more processors configured to:
receive, as input, a compliance specification;
extract requirements from the compliance specification; and
a modelling engine executable by the one or more processors, wherein the modelling engine comprises a multi-label classifier and is configured to:
receive the requirements as input;
generate first vectorized data and second vectorized data based on the requirements;
apply first labeling logic to the first vectorized data to produce first labeled data;
apply second labeling logic to the second vectorized data to produce second labeled data; and
map the requirements to pieces of code stored in one or more code libraries based on the first labeled data and the second labeled data to produce a set of validation code,
wherein the one or more processors are configured to apply the set of validation code to information associated with a product or process to evaluate whether the product or process complies with the requirements.

12. The system of claim 11, wherein the first vectorized data is generated using a first tokenization and vectorization process configured to ignore a grammatical structure of the requirements and the second vectorized data is generated using a second tokenization and vectorization process is configured to consider the grammatical structure of the requirements.

13. The system of claim 11, wherein the compliance specification is received in a first file format, wherein the one or more processors are configured to:
read the compliance specification in the first file format; and
generate a copy of the compliance specification based on the reading, wherein the copy of the compliance specification is associated with a second file format, and wherein the requirements are extracted from the copy of the compliance specification.

14. The system of claim 11, wherein the multi-label classifier comprises a first set of labels and a second set of labels, the first set of labels and the second set of labels being different, wherein the first labelling logic is configured to label the first vectorized data based on the first set of labels and the second labelling logic is configured to label the second vectorized data based on the second set of labels.

15. The system of claim 14, wherein labels applied to the first vectorized data by the first labelling logic and labels applied to the second vectorized data by the second labelling logic are represented using binary values.

16. A non-transitory computer-readable storage medium storing instructions that, when executed by one or more processors, cause the one or more processors to perform operations for automatic compliance validation using a dynamically generated set of validation code, the operations comprising:
- receiving, as input, requirements extracted from a compliance specification;
- generating first vectorized data and second vectorized data based on the requirements;
- applying first labeling logic to the first vectorized data to produce first labeled data;
- applying second labeling logic to the second vectorized data to produce second labeled data;
- mapping the requirements to pieces of code stored in one or more code libraries based on the first labeled data and the second labeled data to produce a set of validation code; and
- applying the set of validation code to information associated with a product or process to evaluate whether the product or process complies with the requirements.

17. The non-transitory computer-readable storage medium of claim 16, wherein the first vectorized data is generated using a first tokenization and vectorization process configured to ignore a grammatical structure of the requirements and the second vectorized data is generated using a second tokenization and vectorization process is configured to consider the grammatical structure of the requirements.

18. The non-transitory computer-readable storage medium of claim 16, wherein wherein a first tokenization and vectorization process and the second tokenization and vectorization process correspond to functionality of a multi-label classifier that includes a first set of labels and a second set of labels, the first set of labels and the second set of labels being different, and wherein the first labelling logic is configured to label the first vectorized data based on the first set of labels and the second labelling logic is configured to label the second vectorized data based on the second set of labels.

19. The non-transitory computer-readable storage medium of claim 18, wherein labels applied to the first vectorized data by the first labelling logic and labels applied to the second vectorized data by the second labelling logic are represented using binary values.

20. The non-transitory computer-readable storage medium of claim 16, wherein the compliance specification is received in a first file format, wherein the operations comprise:
- reading the compliance specification in the first file format;
- generating a copy of the compliance specification based on the reading, wherein the copy of the compliance specification is associated with a second file format, and wherein the requirements are extracted from the copy of the compliance specification;
- generating a log during the evaluating, wherein the log comprises information that indicates whether the product or process complies with the requirements; and
- generating one or more outputs based on the log, the one or more outputs comprising a graphical representation of the information included in the log, a document containing the information included in the log, or both.

* * * * *